(12) United States Patent
Ninomiya et al.

(10) Patent No.: US 10,855,157 B2
(45) Date of Patent: Dec. 1, 2020

(54) POWER GENERATION DEVICE

(71) Applicant: ALPS ALPINE CO., LTD., Tokyo (JP)

(72) Inventors: Nobuyuki Ninomiya, Miyagi (JP); Tatsuaki Kawase, Miyagi (JP); Shuji Fujiwara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 5 days.

(21) Appl. No.: 16/281,528

(22) Filed: Feb. 21, 2019

(65) Prior Publication Data

US 2019/0181739 A1 Jun. 13, 2019

Related U.S. Application Data

(63) Continuation of application No. PCT/JP2017/029459, filed on Aug. 16, 2017.

(30) Foreign Application Priority Data

Sep. 2, 2016 (JP) .................................. 2016-171502

(51) Int. Cl.
*H02K 35/02* (2006.01)
*H02K 35/06* (2006.01)
*H02K 39/00* (2006.01)

(52) U.S. Cl.
CPC ............. *H02K 35/02* (2013.01); *H02K 35/06* (2013.01); *H02K 39/00* (2013.01)

(58) Field of Classification Search
CPC ........ H02K 35/02; H02K 35/00; H02K 39/00; H02K 7/1869; H02K 7/1876; H02K 33/02; H01F 7/14; H01F 7/122

(Continued)

(56) References Cited

U.S. PATENT DOCUMENTS

| 2,518,479 A * | 8/1950 | Lee .......................... H02K 9/22 310/40 R |
| 3,963,948 A | 6/1976 | Bratkowski et al. |
| 2016/0294256 A1* | 10/2016 | Ohishi ................. H02K 7/1892 |

FOREIGN PATENT DOCUMENTS

| JP | 2009-199961 | 9/2009 |
| JP | 2015047003 A * | 3/2015 ........... B60C 23/041 |

(Continued)

OTHER PUBLICATIONS

JP-2015139267-A (English Translation) (Year: 2015).*

(Continued)

*Primary Examiner* — Quyen P Leung
*Assistant Examiner* — Alexander Moraza
(74) *Attorney, Agent, or Firm* — IPUSA, PLLC

(57) ABSTRACT

A power generation device includes a push member configured to move back and forth in a first pushing direction and a second pushing direction to push a rotating body to move between a first stable attitude and a second stable attitude, an operation member configured to move in a first direction and a second direction, and a switching spring member arranged between the operation member and the push member. The switching spring member is configured to urge the push member in the first pushing direction to cause the rotating body to move toward the second stable attitude when the operation member moves in the first direction, and the switching spring member is configured to urge the push member in the second pushing direction to cause the rotating body to move toward the first stable attitude when the operation member moves in the second direction.

10 Claims, 11 Drawing Sheets

(58) Field of Classification Search
USPC .......................................... 310/15, 17, 20, 25
See application file for complete search history.

(56) References Cited

FOREIGN PATENT DOCUMENTS

| | | | |
|---|---|---|---|
| JP | 2015-139267 | | 7/2015 |
| JP | 2015139267 A | * | 7/2015 |
| WO | 2015/029655 | | 3/2015 |

OTHER PUBLICATIONS

JP-2015047003-A (English Translation) (Year: 2015).*
International Search Report dated Nov. 21, 2017 in PCT/JP2017/029459 filed on Aug. 16, 2017.

* cited by examiner

POWER GENERATION DEVICE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2017/029459 filed on Aug. 16, 2017 and designating the U.S., which claims priority to Japanese Patent Application No. 2016-171502 filed on Sep. 2, 2016. The entire contents of the foregoing applications are incorporated herein by reference.

BACKGROUND OF THE INVENTION

1. Field of the Invention

The present invention relates to a power generation device that induces an electromotive force in a power generation coil by moving an operation member to change the direction of a magnetic flux in a magnetic path forming member.

2. Description of the Related Art

Japanese Unexamined Patent Publication No. 2015-139267 describes an invention relating to a power generation input device. The power generation input device includes a magnetic path forming member. The magnetic path forming member includes a first arm portion, a second arm portion, and a power generation coil wound around each of the arm portions. A drive body (rotating body) is provided between the first arm portion and the second arm portion. The drive body includes a magnet having a first magnetization surface and a second magnetization surface, a first magnetized member fixed to the first magnetization surface, and a second magnetized member fixed to the second magnetization surface.

The drive body stabilizes in a first attitude in which the first magnetized member faces the first arm portion and the second magnetized member faces the second arm portion, and in a second attitude in which the first magnetized member faces the second arm portion and the second magnetized member faces the first arm portion.

A connection slot is formed in a slide member operated by an operation member, and a connection pin provided in the drive body is slidably inserted in the connection slot.

When the operation member is pushed, the pushing force is transmitted to the slide member via a first elastic member such that the connection slot and the connection pin slide against each other, and the movement of the slide member is converted into a rotational force for the drive body. When the drive body rotates and changes its attitude from the first attitude to the second attitude, the direction of a magnetic flux in the magnetic path forming member changes, and an electromotive force is induced in the power generation coil. When the pushing force of the operation member is released, the slide member is returned to its original position by an urging force of a second elastic member. At this time, the drive body is rotated from the second attitude to the first attitude by the returning force of the slide member, and the direction of the magnetic flux in the magnetic path forming member is changed once again such that an electromotive force is induced once again.

In the power generation input device described in Japanese Unexamined Patent Publication No. 2015-139267, when the operation member is pushed, the pushing force acts on the slide member via the first elastic member, and the speed of change in the attitude of the drive body is accelerated by the addition of an assisting force of the first elastic member.

However, in this power generation input device, when the slide member is returned to the upward position by the urging force of the second elastic member, unless the pushing force applied to the operation member is completely released, the speed of change in the attitude of the drive body may be decelerated by the elastic force of the first elastic member, and the electromotive force induced in the power generation coil may be decreased.

SUMMARY OF THE INVENTION

An aspect of the present invention is directed to providing a power generation device that is capable of by swiftly rotating a stable rotating body with an urging force of a switching spring member to obtain a large electromotive force irrespective of the pushing speed of an operation member.

According to one embodiment of the present invention, a power generation device is provided that includes a magnetic path forming member including a first opposing end portion and a second opposing end portion, a power generation coil in which an electromotive force is induced by a change in a magnetic flux in the magnetic path forming member, and a rotating body positioned within an opposing space between the first opposing end portion and the second opposing end portion.

The rotating body includes a magnet including a first magnetization surface and a second magnetization surface with opposite magnetic poles, a first magnetized member that is made of a magnetic material and is fixed to the first magnetization surface, and a second magnetized member that is made of a magnetic member and is fixed to the second magnetization surface.

The rotating body is configured to be rotatable between a first stable attitude and a second stable attitude. In the first stable attitude, the first magnetized member faces the first opposing end portion, and the second magnetized member faces the second opposing end portion. In the second stable attitude, the first magnetized member faces the second opposing end portion, and the second magnetized member faces the first opposing end portion.

The power generation device further includes a push member configured to move back and forth to push the rotating body in a first pushing direction for pushing the rotating body toward the second stable attitude and a second pushing direction for pushing the rotating body toward the first stable attitude, and an operation member configured to move in a first direction and a second direction.

The power generation device further includes a switching spring member arranged between the operation member and the push member. The switching spring member is configured to urge the push member in the first pushing direction to cause the rotating body to move toward the second stable attitude when the operation member moves in the first direction, and the switching member is configured to urge the push member in the second pushing direction to cause the rotating body to move toward the first stable attitude when the operation member moves in the second direction.

DESCRIPTION OF THE EMBODIMENTS

In the following, embodiments of the present invention will be described with reference to the accompanying drawings.

Figure 1:
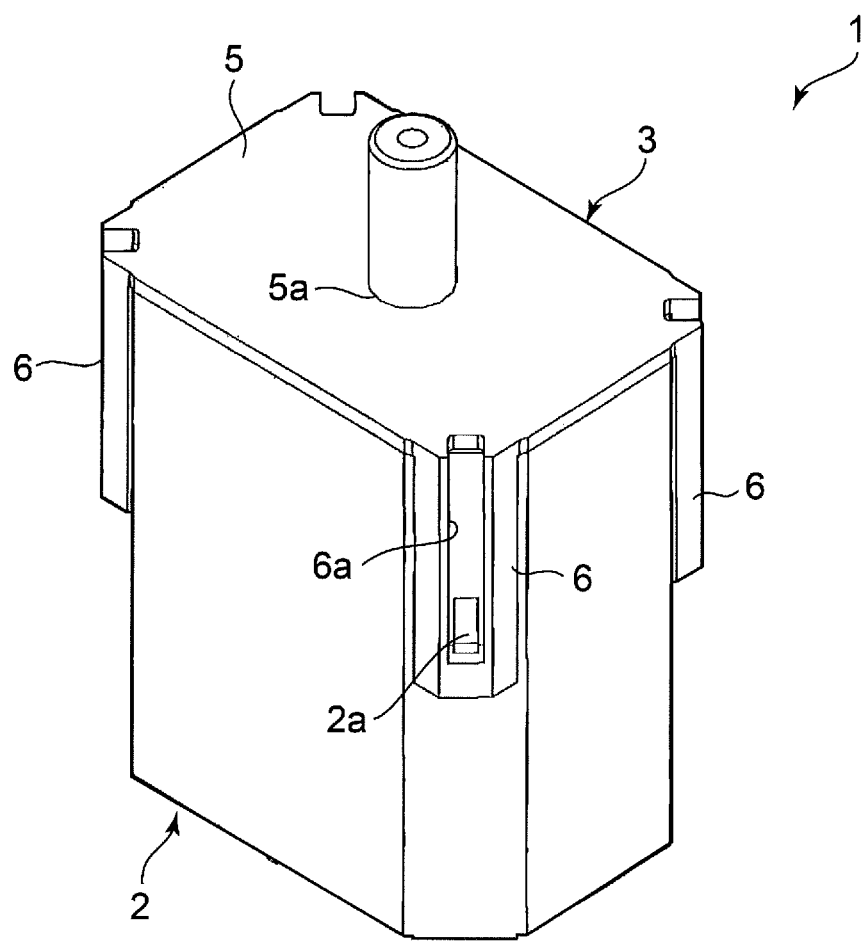
FIG. 1 is an external perspective view of a power generation device according to an embodiment of the present invention.
Figure 1:
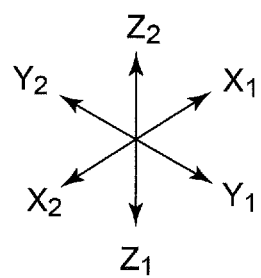
Figure 2:
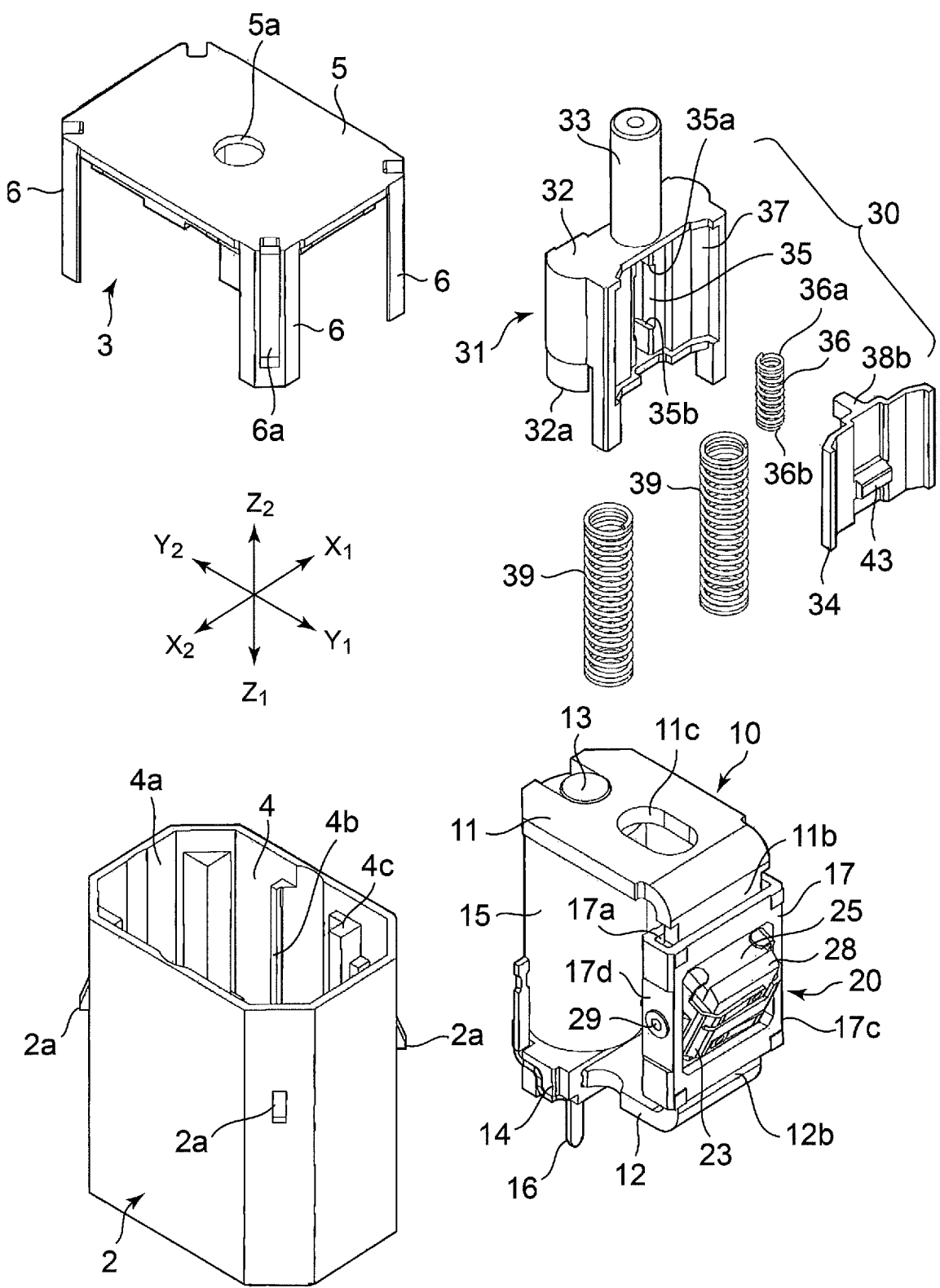
FIG. 2 is an exploded perspective view of the power generation device shown in FIG. 1.

As shown in FIGS. 1 and 2, a power generation device 1 according to an embodiment of the present invention includes a first case 2 and a second case 3 that constitute a housing. The first case 2 and the second case 3 are made of synthetic resin. The first case 2 has a receiving space 4 formed therein and an opening 4a formed at the upper end thereof. The second case 3 includes a quadrilateral lid portion 5 and connecting leg portions 6 integrally extending downward from the corners of the lid portion 5. Also, the lid portion 5 has a through hole 5a formed therein.

Locking protrusions 2a are integrally formed on outer corner portions of the first case 2. Elongated locking slots 6a are formed in the connecting leg portions 6. As shown in FIG. 1, by arranging the connecting leg portions 6 on the outer side of the first case 2 and locking the elongated locking slots 6a with their corresponding locking protrusions 2a, the opening 4a of the first case 2 is closed by the lid portion 5 of the second case 3, and the housing is thereby assembled.

As shown in FIG. 2, a magnetic path forming member 10, a power generation coil 15 constituting a part of the magnetic path forming member 10, a rotating body 20 rotatably combined with the magnetic path forming member 10, and an operation force transmitting portion 30 are accommodated in the housing formed by the first case 2 and the second case 3.

Figure 3:
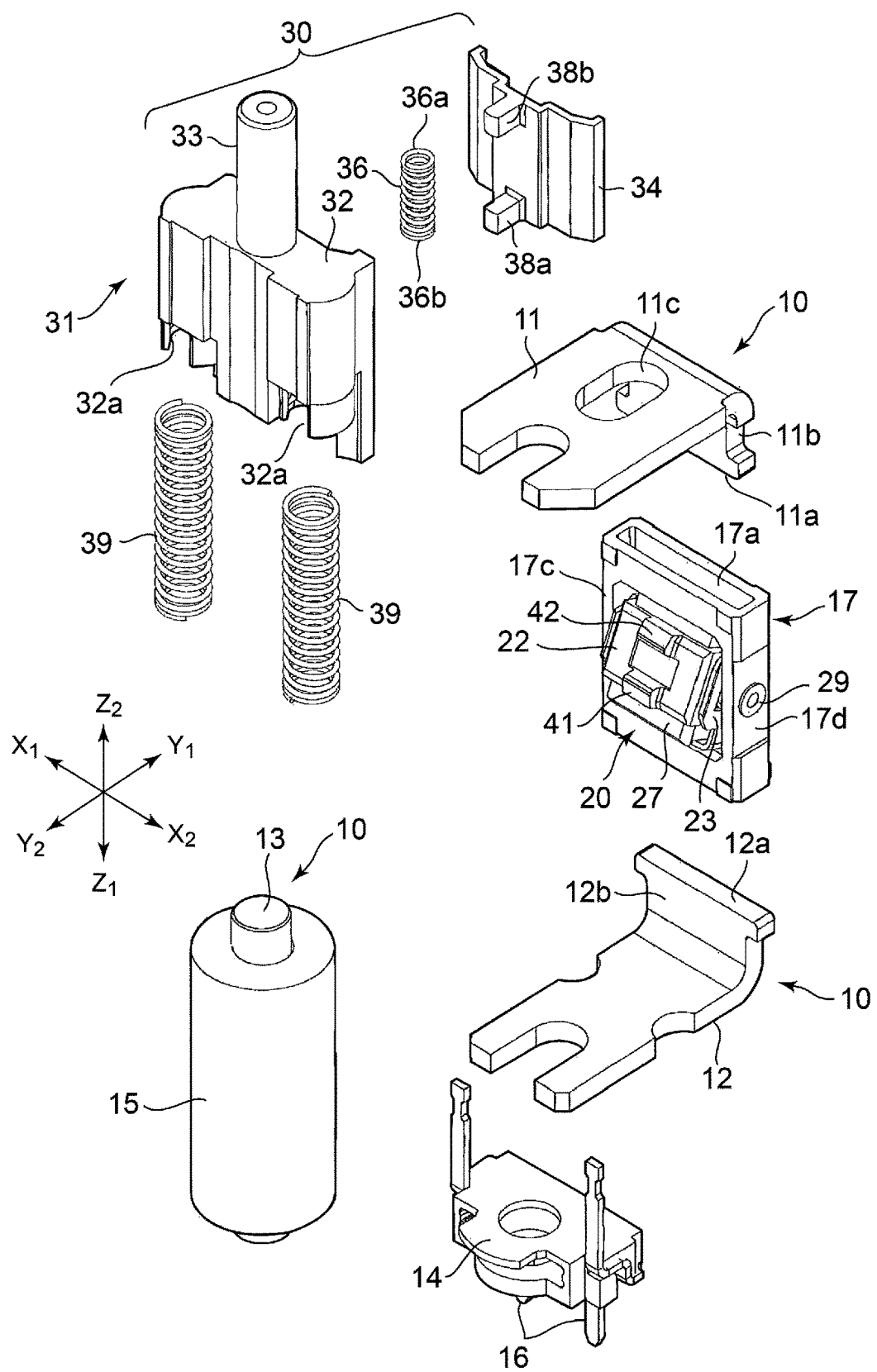
FIG. 3 is an enlarged exploded perspective view of a main part of the power generation device shown in FIG. 1.

As shown in FIG. 3, the magnetic path forming member 10 includes an upper magnetic yoke 11, a lower magnetic yoke 12, and a coil magnetic core 13 arranged at the Y2 side that is interlocked with both the upper magnetic yoke 11 and the lower magnetic yoke 12. The upper magnetic yoke 11, the lower magnetic yoke 12, and the coil magnetic core 13 are made of a magnetic metal material. The power generation coil 15 is formed by a coated conductive wire being wound multiple times around the coil magnetic core 13.

Figure 6:
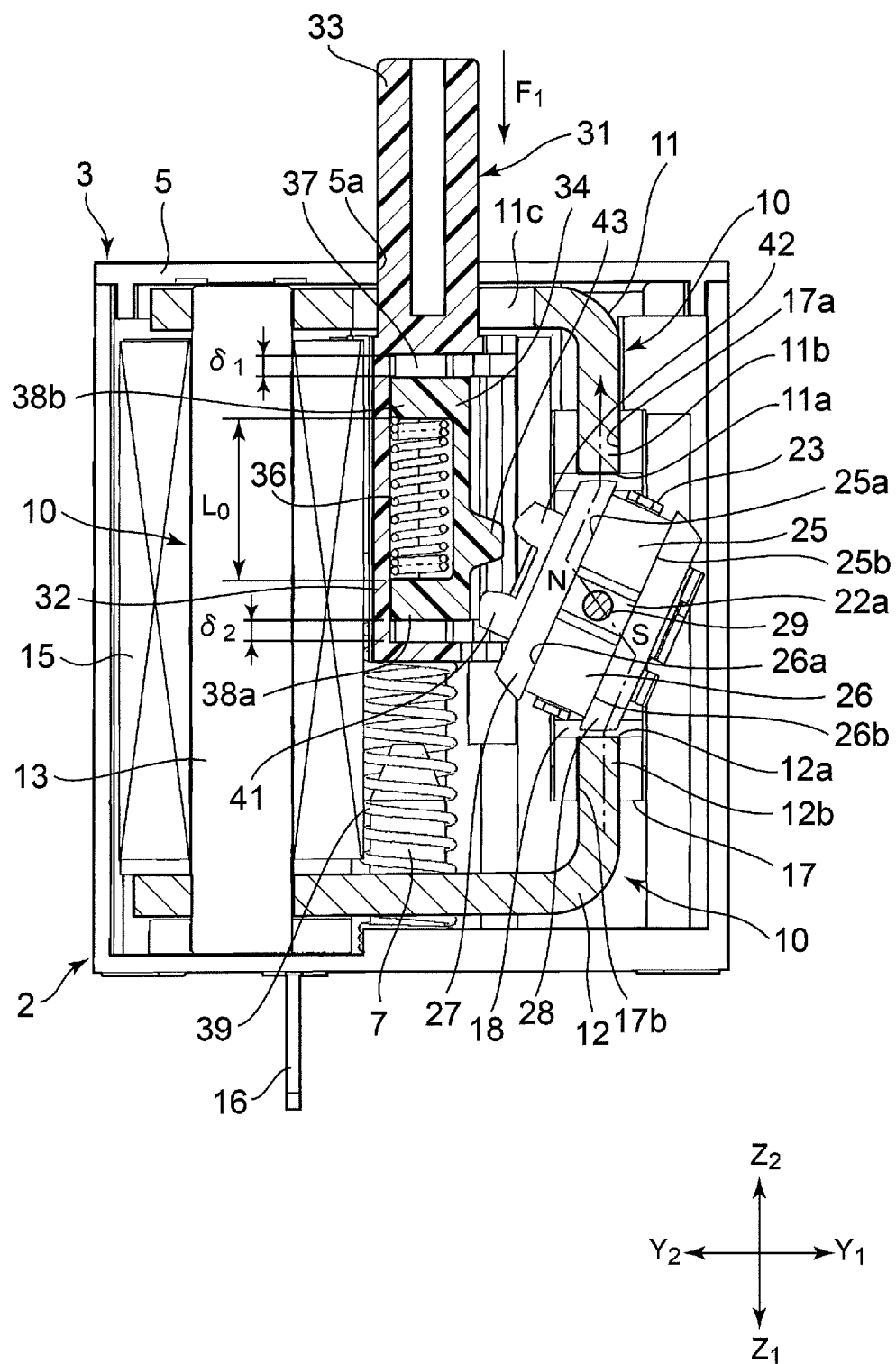
FIG. 6 is a cross-sectional view showing an initial state of the power generation device.

As shown in FIGS. 2 and 3, an interlocking portion of the lower magnetic yoke 12 and the coil magnetic core 13 is held by a lower holder 14 that is made of synthetic resin. A pair of terminals 16 is held by the lower holder 14, and the two ends of the coated conductive wire constituting the power generation coil 15 are soldered to the respective terminals 16. As shown in FIG. 6, when the magnetic path forming member 10 and the power generation coil 15 are accommodated in the first case 2, the pair of terminals 16 protrudes downward from the bottom of the first case 2.

As shown in FIG. 2, the magnetic path forming member 10 includes a frame body 17. The frame body 17 is made of a non-magnetic material such as a synthetic resin material. As shown in the enlarged view of FIG. 5, the frame body 17 has a quadrilateral opposing space 18 formed in its center portion. The frame body 17 has a holding groove 17a penetrating through a portion above the opposing space 18 in the vertical direction (Z1-Z2 direction) and a holding groove 17b penetrating through a portion below the opposing space 18 in the vertical direction.

As shown in FIGS. 3 and 6, a portion on the Y1 side of the upper magnetic yoke 11 is bent downward, and a bent end portion 11b of the upper magnetic yoke 11 is held inside the holding groove 17a on the upper side of the frame body 17. A portion on the Y1 side of the lower magnetic yoke 12 is bent upward, and a bent end portion 12b of the lower magnetic yoke 12 is held inside the holding groove 17b on the lower side of the frame body 17.

As shown in FIG. 6, an end surface of the bent end portion 11b of the upper magnetic yoke 11 corresponds to a first opposing end portion 11a, and an end surface of the bent end portion 12b of the lower magnetic yoke 12 corresponds to a second opposing end portion 12a. The opposing space 18 of the frame body 17 is a space in which the first opposing end portion 11a and the second opposing end portion 12a of the magnetic path forming member 10 oppose each other from the upper side and the lower side.

Figure 5:
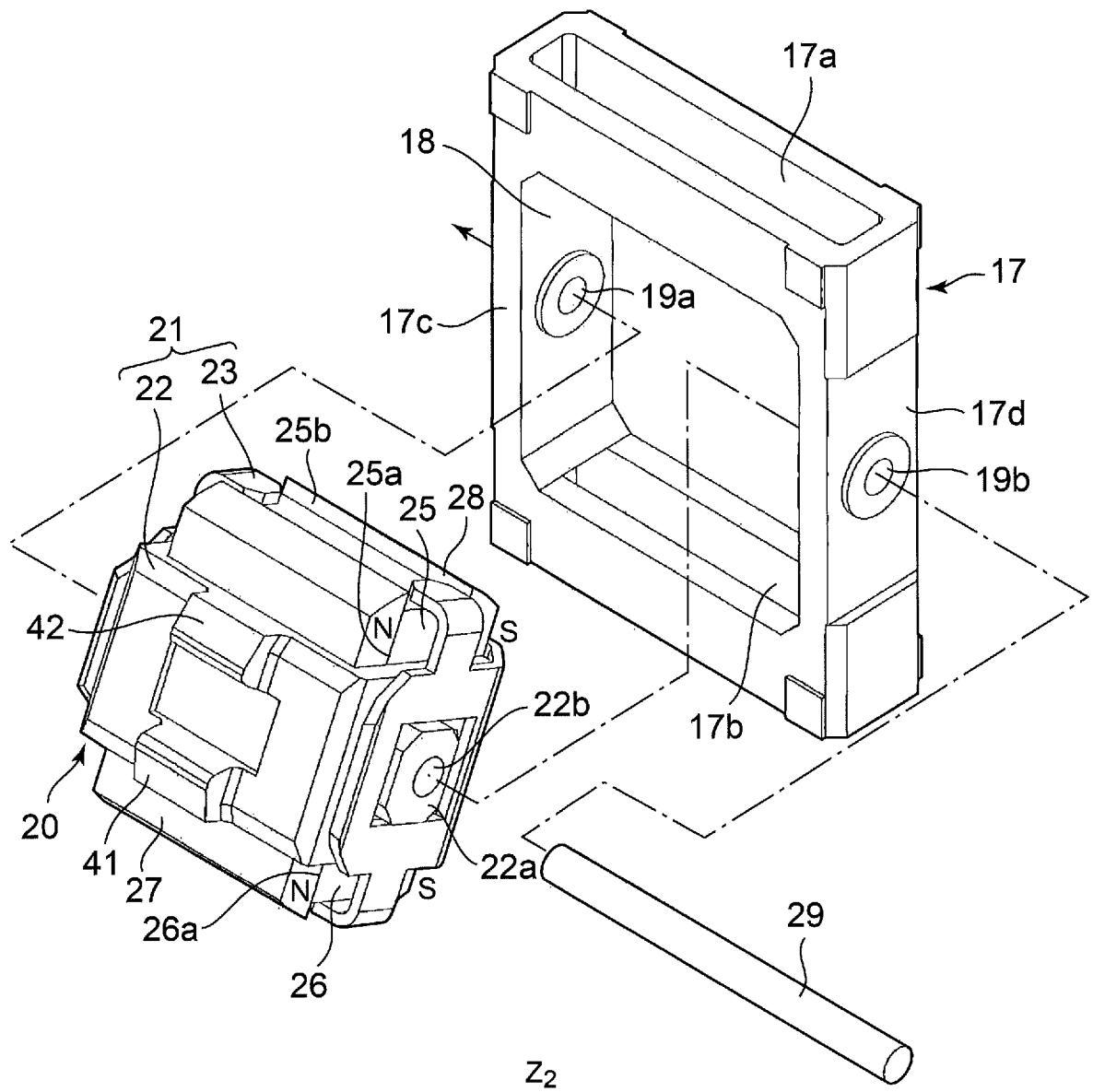
FIG. 5 is an exploded perspective view showing the configuration of a rotating body.

The rotating body 20 is rotatably accommodated in the opposing space 18 of the frame body 17. As shown in FIG. 5, the rotating body 20 includes a holding structure 21. The holding structure 21 includes a holding member 22 made of a synthetic resin material and a holding metal fitting 23 made of a nonmagnetic metal plate. The holding member 22 includes a bearing portion 22a extending in the X1-X2 direction.

As shown in FIGS. 5 and 6, the holding structure 21 of the rotating body 20 includes a first magnet 25 arranged on the upper side (Z2 side) and a second magnet 26 arranged on the lower side (Z1 side) with the bearing portion 22a interposed between the first magnet 25 and the second magnet 26. The first magnet 25 has a first magnetization surface 25a magnetized to the N pole facing the Y2 side and a second magnetization surface 25b magnetized to the S pole facing the Y1 side. The second magnet 26 also has a first magnetization surface 26a magnetized to the N pole facing the Y2 side and a second magnetization surface 26b magnetized to the S pole facing the Y1 side.

A first magnetized member 27 and a second magnetized member 28 are held in the holding member 22. The first magnetized member 27 and the second magnetized member 28 are made of magnetic metal plates. The first magnetized member 27 is arranged in close contact with the first magnetization surface 25a of the first magnet 25 and the first magnetization surface 26a of the second magnet 26, and the second magnetized member 28 is arranged in close contact with the second magnetization surface 25b of the first magnet 25 and the second magnetization surface 26b of the second magnet 26.

In assembling the rotating body 20, the first magnetized member 27 is inserted into the holding member 22, and the first magnet 25 and the second magnet 26 are fixed to the first magnetized member 27 by being attracted thereto as shown in the enlarged view of FIG. 5. Meanwhile, the second magnetized member 28 is arranged on the inner side of the holding metal fitting 23. Then, the rotating body can be assembled by combining the holding member 22 having the first magnetized member 27, the first magnet 25, and the second magnet 26 arranged therein, and the holding metal fitting 23 having the second magnetized member 28 arranged therein. Note that because the first magnetized member 27 and the second magnetized member 28 are magnetically attracted to the first magnet 25 and the second magnet 26, the first magnetized member 27 and the second magnetized member 28 may be reliably fixed in place.

Note that the rotating body 20 may be configured using the so-called insert molding method that involves combining the first magnet 25 and the second magnet 26 with the first magnetized member 27 and the second magnetized member 28, holding the combined structure in a metal mold, and injecting a synthetic resin material into the metal mold to form the holding member 22 (holding structure 21), for example.

The rotating body 20 has the bearing portion 22a, which is a part of the holding member 22 (holding structure 21), arranged between the first magnet 25 and the second magnet 26. The bearing portion 22a has a shaft support hole 22b penetrating through the bearing portion 22a in the X1-X2 direction.

As shown in FIG. 5, the frame body 17 has a frame wall 17c formed on the X1 side and a frame wall 17d formed on the X2 side of the opposing space 18. The frame wall 17c has a bearing hole 19a formed therein, and the frame wall 17d has a bearing hole 19b formed therein. The rotating body 20 is arranged inside the opposing space 18 of the frame body 17, and a support shaft 29 made of metal is inserted into the bearing holes 19a and 19b and the shaft support hole 22b of the holding member 22 so that the rotating body 20 is rotatably supported inside the opposing space 18.

The rotating body 20 has the bearing portion 22a made of synthetic resin arranged between the first magnet 25 and the second magnet 26, and the support shaft 29 made of metal is inserted into the bearing portion 22a. By using the support shaft 29 that is made of metal, a durable rotation supporting structure for the rotating body 20 can be configured in the frame body 17.

As shown in FIG. 2, the operation force transmitting portion 30 includes an operation member 31. The operation member 31 is configured by a slide portion 32 and an operation shaft 33 that are integrally formed with a synthetic resin material. The slide portion 32 is interlocked with a push member 34 on the Y1 side. The push member 34 is made of a synthetic resin material.

Figure 4:
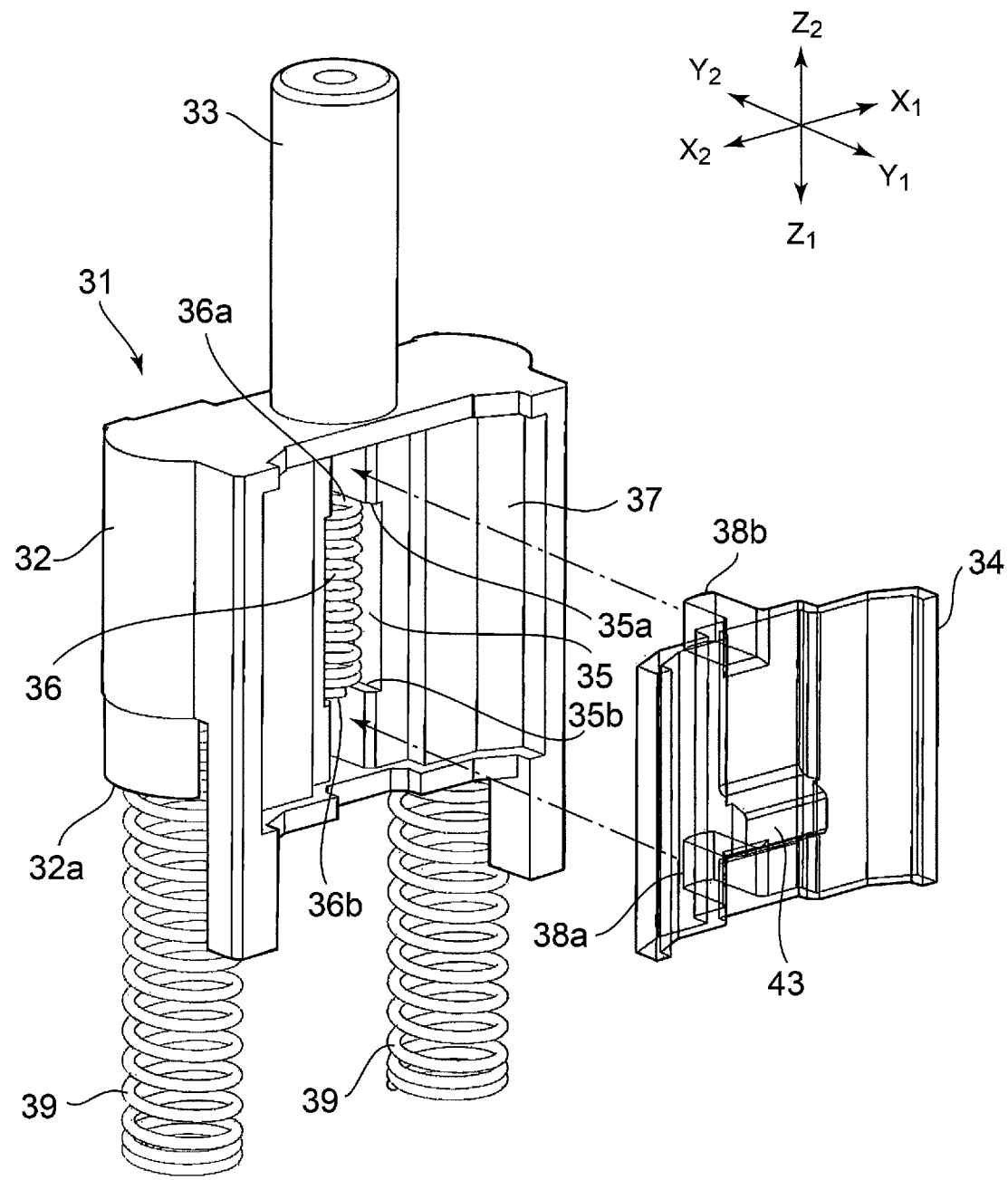
FIG. 4 is a partial exploded perspective view showing an operation member, a push member, a switching spring member, and a return spring member provided in the power generation device.

FIG. 4 is an enlarged view showing the operation member 31 and the push member 34. In FIG. 4, the push member 34 is illustrated in a transparent state.

As shown in FIG. 4, the slide portion 32 of the operation member 31 has a vertically extending spring holding recess 35 formed therein. The upper end of the spring holding recess 35 corresponds to a first spring contact portion 35a and the lower end of the spring holding recess 35 corresponds to a second spring contact portion 35b. The first spring contact portion 35a and the second spring contact portion 35b are spaced apart to oppose each other in the vertical direction corresponding to the moving direction of the operation member 31. A switching spring member 36, which is a compression coil spring, is held in the spring holding recess 35. The switching spring member 36 is arranged in the spring holding recess 35 such that its free length is compressed in the vertical direction. At this time, a side portion constituting a part of an upper end portion 36a of the switching spring member 36 is held in contact with the first spring contact portion 35a, and a side portion constituting a part of a lower end portion 36b of the switching spring member 36 is held in contact with the second spring contact portion 35b.

As shown in FIG. 4, the slide portion 32 has a slide recess 37 facing the Y1 side, and the push member 34 is held in the slide recess 37 so that it can slide up and down inside the slide recess 37. The push member 34 has a first urging force action portion 38a protruding in the Y2 direction on the lower side (Z1 side) and a second urging force action portion 38b protruding in the Y2 direction on the upper side (Z2 side) as integrally formed portions.

When the push member 34 is arranged inside the slide recess 37, the second urging force action portion 38b is inserted next to the first spring contact portion 35a to face a center part of the upper end portion 36a of the switching spring member 36 (part that does not come into contact with the first spring contact portion 35a) so that the second urging force action portion 38b can come into contact with the center part of the upper end portion 36a. Also, the first urging force action portion 38a is inserted next to the second spring contact portion 35b to face a center part of the lower end portion 36b of the switching spring member 36 (part that does not come into contact with the second spring contact portion 35b) so that the first urging force action portion 38a can come into contact with the center part of the lower end portion 36b.

In the embodiment shown in FIG. 4, the switching spring member 36 is slightly compressed in the vertical direction and held between the first spring contact portion 35a and the second spring contact portion 35b of the slide portion 32. Meanwhile, the first urging force action portion 38a and the second urging force action portion 38b of the push member 34 is in light contact with or slightly spaced apart by a small distance from the lower end portion 36b and the upper end portion 36a of the switching spring member 36, respectively. However, in other embodiments, the switching spring member 36 may be slightly compressed in the vertical direction to be held between the first urging force action portion 38a and the second urging force action portion 38b of the push member 34, and the first spring contact portion 35a and the second spring contact portion 35b of the slide portion 32 may be in light contact with or slightly spaced apart by a small distance from the upper end portion 36a and the lower end portion 36b of the switching spring member 36, respectively.

The operation force transmitting portion 30 including the switching spring member 36 and the push member 34 is held between the upper magnetic yoke 11 and the lower magnetic yoke 12, and is inserted into the receiving space 4 of the first case 2 from the upper side. At this time, the operation shaft 33 protrudes upward from a through hole 11c formed in the upper magnetic yoke 11. When the second case 3 is mounted on the first case 2, the operation shaft 33 protrudes upward from a through hole 5a formed in the second case 3.

As shown in FIG. 2, guide protrusions 4b and 4c extending in the vertical direction and protruding toward the receiving space 4 are integrally formed on side wall inner faces of the first case 2. After interlocking the slide portion 32 of the operation member 31 and the push member 34, X1 side portions and X2 side portions of the slide portion 32 and the push member 34 are slidably inserted between the guide protrusions 4b and 4c. As a result, the operation member 31 can move in the vertical direction inside the first case 2, and the push member 34 can move in the vertical direction relative to the operation member 31.

As shown in FIGS. 2 and 3, spring holding portions 32a are formed on a X1 side lower portion and a X2 side lower portion of the slide portion 32 of the operation member 31. As shown in FIG. 6, a pair of spring support portions 7 protruding upward at positions separated from each other in the X1-X2 direction are integrally formed on a bottom portion of the first case 2. A pair of return spring members 39 are arranged inside the first case 2. The return spring member 39 is a compression coil spring having an upper end portion held by the spring holding portion 32a of the slide portion 32 and having a lower end portion that receives the spring support portion 7 inserted therein. As a result, the operation member 31 is constantly urged upward by the pair of return spring members 39.

Because the slide portion 32 of the operation member 31 is urged upward by the pair of return spring members 39, the operation member 31 may be able to move up and down in the receiving space 4 of the first case 2 in a stable attitude.

Also, winding center lines of the pair of return spring members 39 and the switching spring member 36 are arranged to be parallel to each other, and the upper parts of the pair of return spring members 39 and the lower part of the switching spring member 36 are arranged to overlap in a direction perpendicular to the winding center line. In other words, at least parts of the pair of return spring members 39 and the switching spring member 36 are arranged at overlapping positions in the vertical direction. As a result, the size of the operation force transmitting portion 30 in the vertical direction can be reduced, and the power generation device 1 can be miniaturized.

As shown in FIG. 5, the rotating body 20 has a first pushed portion 41 and a second pushed portion 42 that are integrally formed on the holding member 22. The first pushed portion 41 and the second pushed portion 42 protrude in the Y2 direction and are spaced apart in the rotation direction of the rotating body 20 to oppose each other. As shown in FIG. 2 and the like, a pushing action portion 43 protruding in the Y1 direction is integrally formed on the push member 34. As shown in the cross-sectional views of FIG. 6 and the like, the pushing action portion 43 is arranged between the first pushed portion 41 and the second pushed portion 42.

In the following, operations of the power generation device 1 will be described.

In the power generation device 1 according to the present embodiment, when the operation shaft 33 is pushed, the operation member 31 moves in a first direction corresponding to the Z1 direction, and the operation member 31 is moved in a second direction (returning direction) corresponding to the Z2 direction by the elastic force of the return spring members 39. As for the moving directions of the push member 34, a first pushing direction is in the Z1 direction, and a second pushing direction is in the Z2 direction.

In FIG. 6, the first magnetized member 27 of the rotating body 20 and the first opposing end portion 11a of the upper magnetic yoke 11 spaced apart to oppose each other, and the second magnetized member 28 and the second opposing end portion 12a of the lower magnetic yoke 12 are spaced apart to oppose each other. Because the first magnetized member 27 is magnetically attracted to the first opposing end portion 11a and the second magnetized member 28 is magnetically attracted to the second opposing end portion 12a, the rotating body 20 is stabilized in the attitude shown in FIG. 6. Note that the rotating body 20 is in a first stable attitude in FIG. 6.

When the rotating body 20 is in the first stable attitude, the magnetic flux from the first magnet 25 and the second magnet 26 travels a path passing through the first magnetized member 27, the upper magnetic yoke 11, the coil magnetic core 13, and the lower magnetic yoke 12 to return to the second magnetized member 28.

Figure 9:
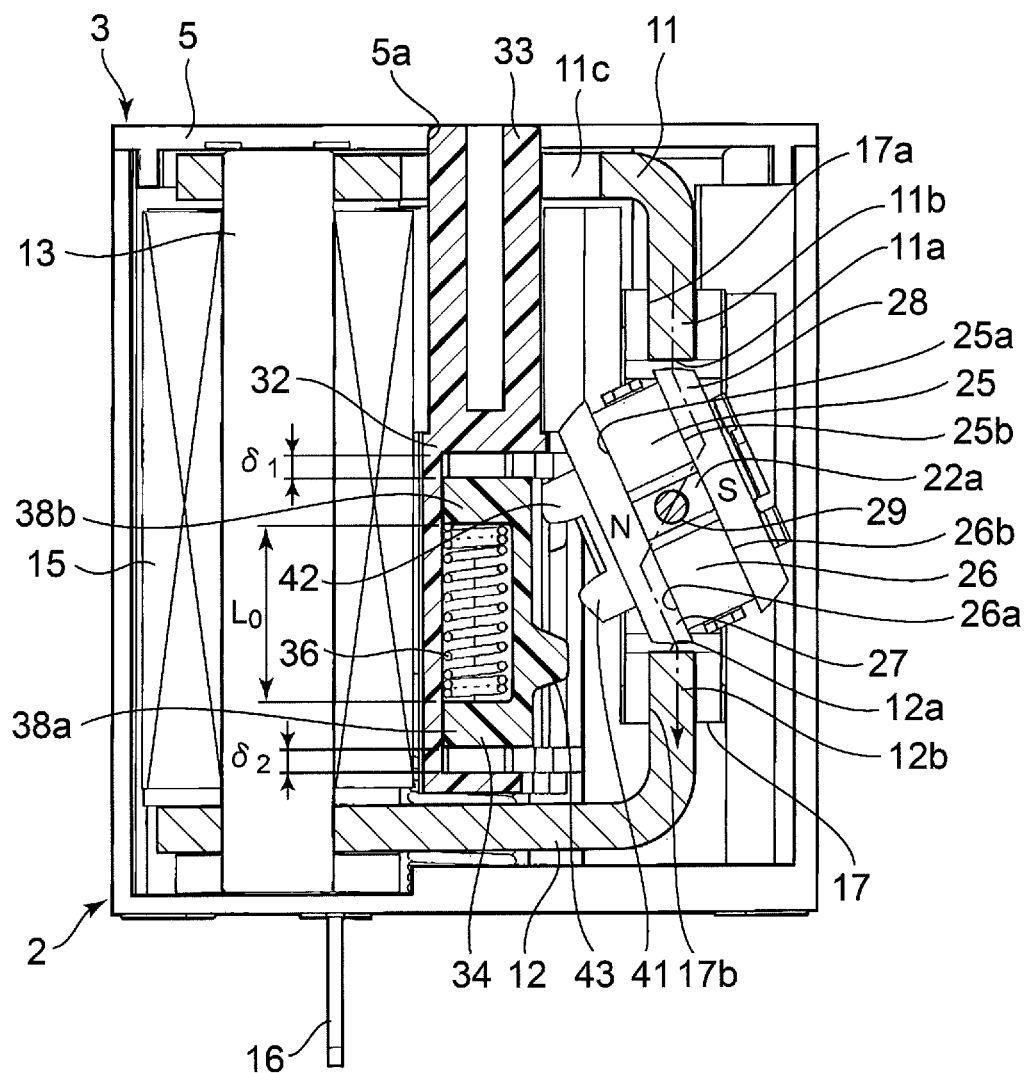
FIG. 9 is a cross-sectional view showing an operation state of the power generation device in which the operation member has reached the end in the first direction and the rotating body has completed its rotation to a second stable attitude.
Figure 9:
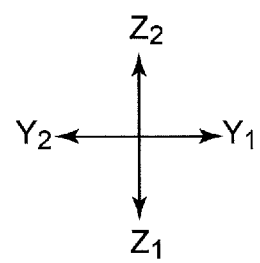

In FIG. 9, the first magnetized member 27 and the second opposing end portion 12a of the lower magnetic yoke 12 are spaced apart to oppose each other, and the second magnetized member 28 and the first opposing end portion 11a of the upper magnetic yoke 11 are spaced apart to oppose each other. Because the first magnetized member 27 is magnetically attracted to the second opposing end portion 12a and the second magnetized member 28 is magnetically attracted to the first opposing end portion 11a, the rotating body 20 is stabilized in the attitude shown in FIG. 9. Note that the rotating body 20 is in a second stable attitude in FIG. 9.

When the rotating body 20 is in the second stable attitude, the magnetic flux from the first magnet 25 and the second magnet 26 travels a path passing through the first magnetized member 27, the lower magnetic yoke 12, the coil magnetic core 13, and the upper magnetic yoke 11 to return to the second magnetized member 28.

FIG. 6 shows an initial state in which the operation member 31 is in an initial attitude by being thrust upward in the second direction (Z2 direction) by the return spring members 39. At this time, the rotating body 20 is stabilized in the first stable attitude. The pushing action portion 43 of the push member 34 is separated from both the first pushed portion 41 and the second pushed portion 42 of the rotating body 20.

In the initial state shown in FIG. 6, the switching spring member 36 is slightly compressed and is held between the first spring contact portion 35a and the second spring contact portion 35b, respectively corresponding to the upper end and the lower end of the spring holding recess 35 as shown in FIG. 4, and the switching spring member 36 is arranged to have an initial length $L_0$. The lower end of the switching spring member 36 having the initial length $L_0$ opposes the first urging force action portion 38a, the upper end of the switching spring member 36 opposes the second urging force action portion 38b, and the push member 34 is arranged inside the slide recess 37 at a neutral position within its vertical moving range. At this time, as shown in FIG. 6, a gap $\delta_1$ is formed between the upper end of the push member 34 and the inner upper end of the slide recess 37 of the slide portion 32, and a gap $\delta_2$ is formed between the lower end of the push member 34 and the inner lower end of the slide recess 37.

When the operation shaft 33 of the operation member 31 in the initial attitude shown in FIG. 6 is pushed in the first direction (Z1 direction) by a pushing force $F_1$, the push member 34 moves downward together with the operation member 31, and the pushing action portion 43 of the push member 34 comes into contact with the first pushed portion 41 formed on the holding member 22 of the rotating body 20. Thereafter, when the operation shaft 33 is further pushed in the first direction (Z1 direction), the rotating body 20 resists movement to maintain the first stable attitude, and as such, only the operation member 31 moves in the first direction (Z1 direction) while the pushing action portion 43 remains at a standstill in contact with the first pushed portion 41.

Figure 7:
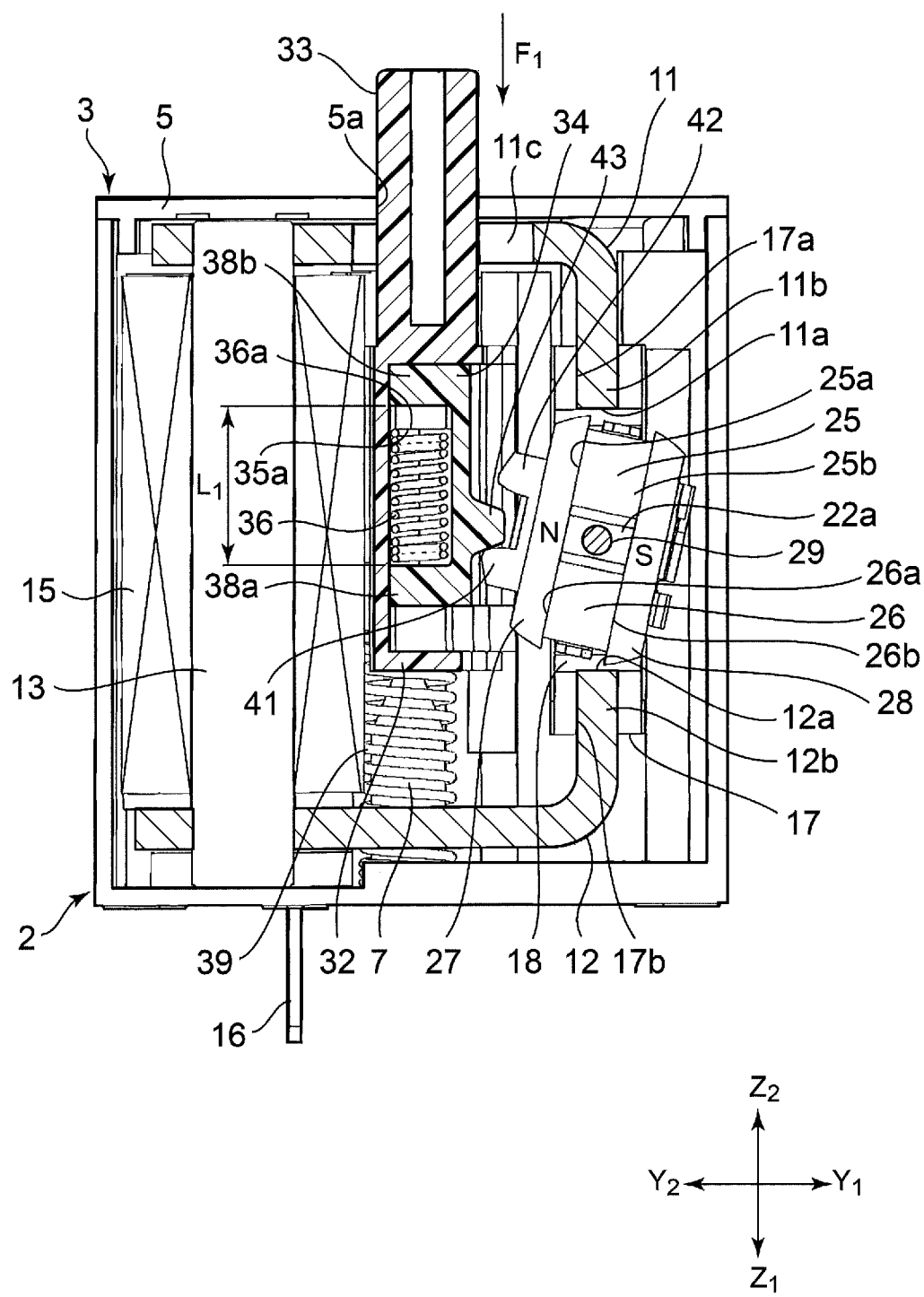
FIG. 7 is a cross-sectional view showing an operation state of the power generating device in which the operation member starts moving in a first direction.

At this time, the upper end portion 36a of the switching spring member 36 is pushed in the Z1 direction by the first spring contact portion 35a formed on the slide portion 32 of the operation member 31, and the upper end portion 36a of the switching spring member 36 moves away from the second urging force action portion 38b of the push member 34. As a result, as shown in FIG. 7, the switching spring member 36 is compressed to have a length $L_1$ between the first urging force action portion 38a and the first spring contact portion 35a. At this time, owing to the elastic force of the switching spring member 36, the urging force in the first pushing direction (Z1 direction) applied to the push member 34 increases, and the pushing force from the pushing action portion 43 acting on the first pushed portion 41 also increases.

When the operation shaft 33 is further pushed in the first direction (Z1 direction) from the state shown in FIG. 7, the push member 34 is slightly pushed in the Z1 direction by the slide portion 32 of the operation member 31, the first pushed portion 41 is pushed downward by the pushing action portion 43 of the push member 34, and the rotating body 20 is slightly rotated counterclockwise from the first stable attitude shown in FIG. 6. At this time, the force acting on the rotating body 20 to rotate counterclockwise owing to the urging force of the compressed switching spring member 36 urging the push member 34 in the first pushing direction (Z1 direction) becomes stronger than the force acting on the rotating body 20 to rotate clockwise to return to the first stable attitude. As such, as shown in FIG. 8, the rotating body 20 is rotated in the counterclockwise direction only by the urging force of the switching spring member 36.

Figure 8:
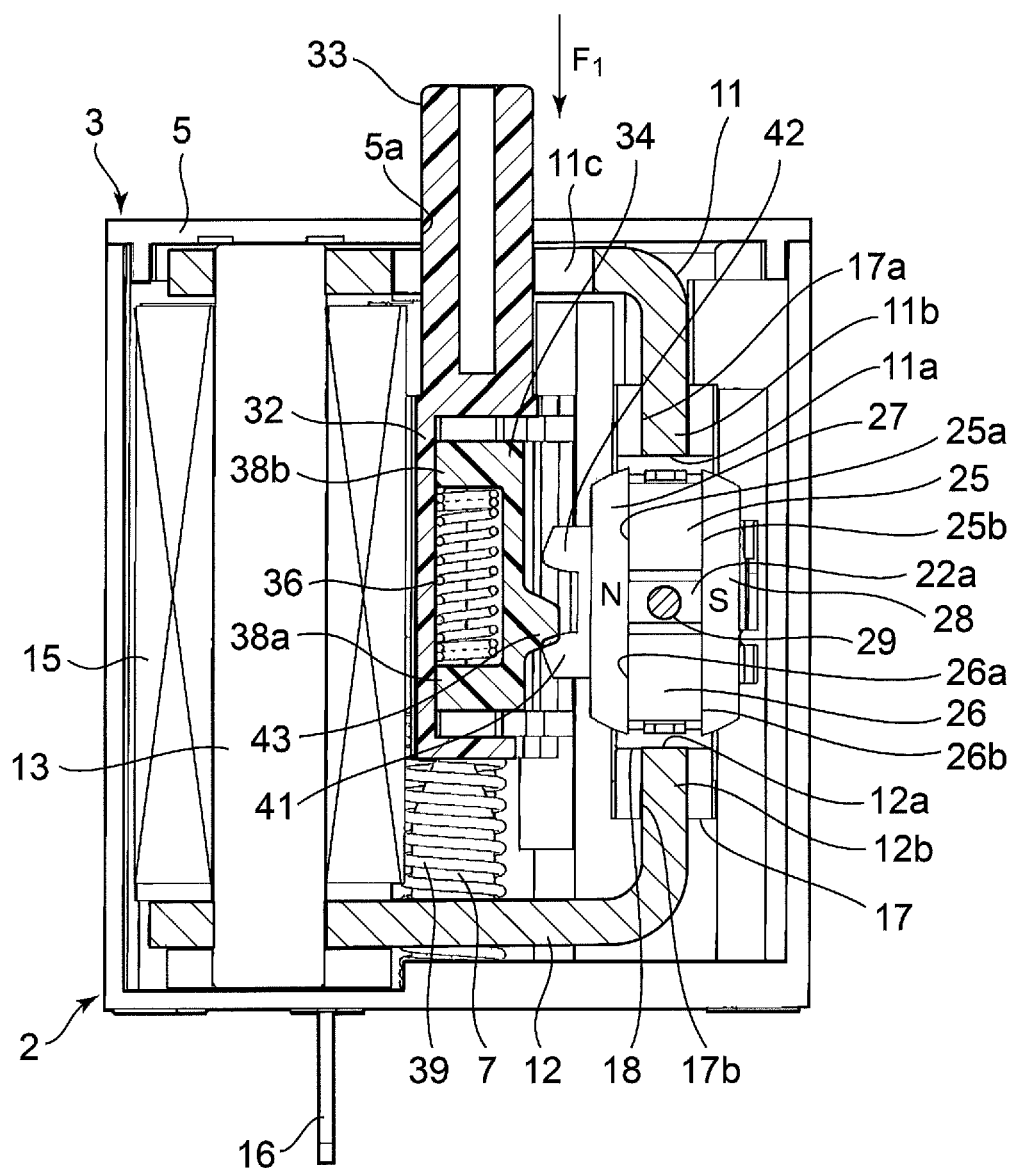
FIG. 8 is a cross-sectional view showing an operation state of the power generation device in which the rotating body is being rotated from a first stable attitude by the push member that is moving in a first pushing direction.
Figure 8:
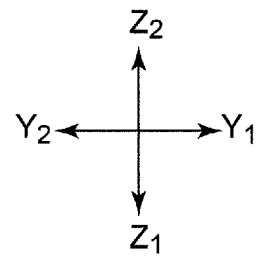

In FIG. 8, the rotating body 20 rotated in the counterclockwise direction by the elastic force of the switching spring member 36 is in a substantially neutral attitude within its rotation range. When the rotating body 20 is further rotated in the counterclockwise direction from the neutral attitude shown in FIG. 8 by the push member 34 that is pushed in the first pushing direction (Z1 direction) by the elastic force of the switching spring member 36, the first magnetized member 27 of the rotating body 20 is magnetically attracted to the second opposing end portion 12a of the lower magnetic yoke 12, and the second magnetized member 28 is magnetically attracted to the first opposing end portion 11a of the upper magnetic yoke 11, and the rotating body 20 swiftly rotates in the counterclockwise direction toward the second stable attitude shown in FIG. 9.

In the operations shown in FIGS. 6 to 9, the rotating body 20 is swiftly rotated from the first stable attitude to the second stable attitude, and as such, the direction of the magnetic flux in the magnetic path forming member 10 is swiftly reversed. Because the magnetic flux in the coil magnetic core 13 is swiftly reversed, an electromotive force is induced in the power generation coil 15. The voltage generated by the electromotive force at this time is output from the pair of terminals 16.

FIG. 9 shows a state in which the operation shaft 33 is pushed downward to a lowest point in the first direction (Z1 direction). At this time, the pushing action portion 43 formed on the push member 34 is separated from both the first pushed portion 41 and the second pushed portion 42 formed on the rotating body 20.

Figure 10:
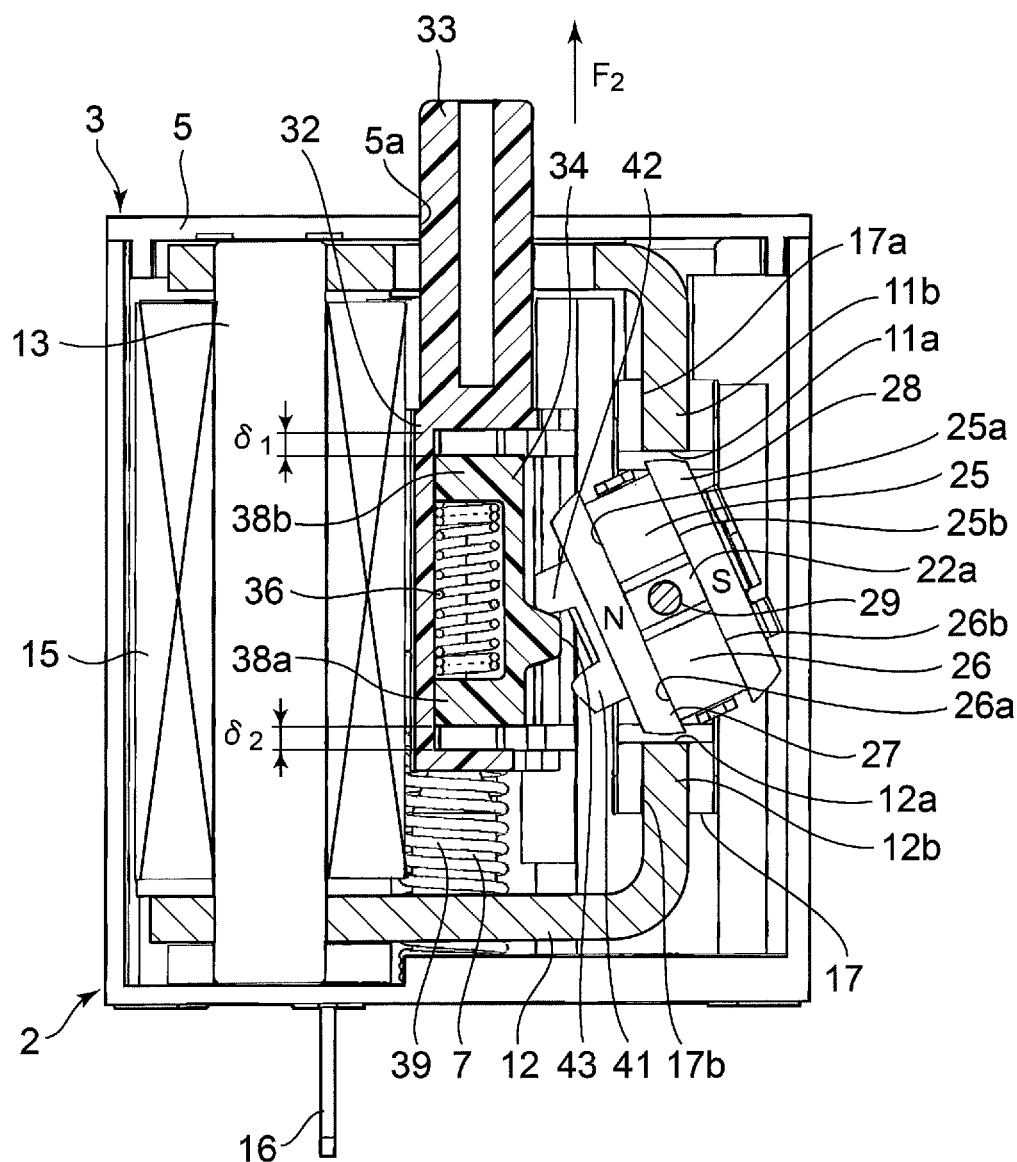
FIG. 10 is a cross-sectional view showing an operation state of the power generation device in which the operation member starts moving back in a second direction.
Figure 10:
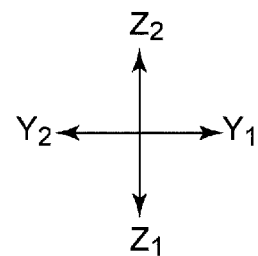
Figure 11:
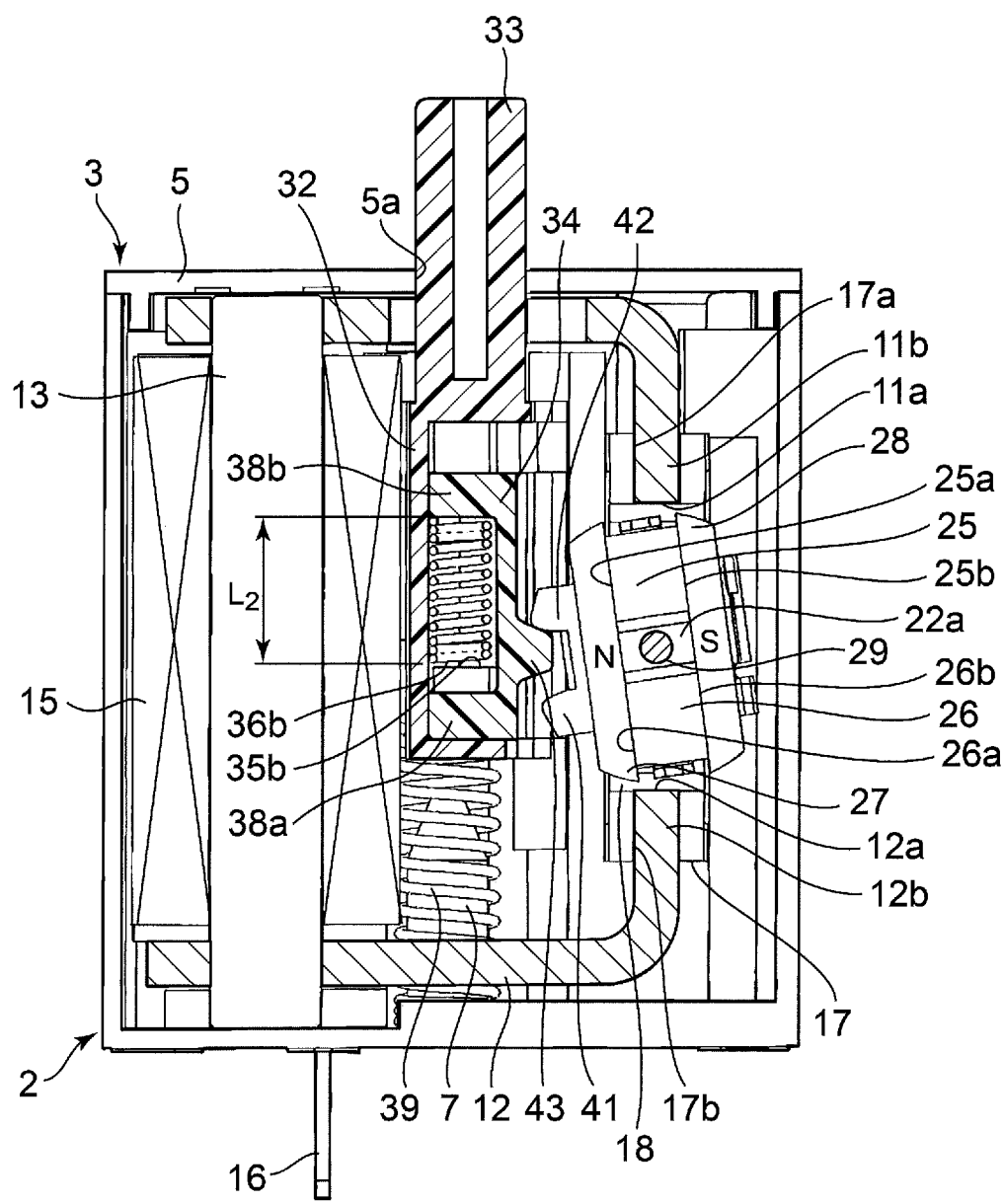
FIG. 11 is a cross-sectional view showing an operation state of the power generation device in which the operation member moves back in the second direction and the rotating body starts to rotate from the second stable attitude.
Figure 11:
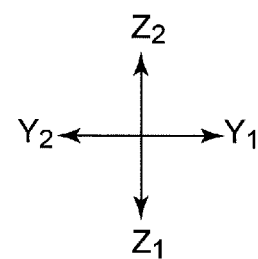

When the pushing force F1 in the first direction (Z1 direction) is removed in the state shown in FIG. 9, a returning force F2 in the second direction (Z2 direction) is applied to the operation member 31 by the return spring members 39, and as a result, the operation member 31 and the push member 34 start to move in the second direction (Z2 direction). After the pushing action portion 43 of the push member 34 comes into contact with the second pushed portion 42 of the rotating body 20 as shown in FIG. 10, when the operation member 31 is moved further in the Z2 direction by the returning elastic force from the return spring members 39, the rotating body 20 resists movement to stabilize in the second stable attitude shown in FIG. 10. As a result, as shown in FIG. 11, the switching spring member 36 is compressed to have a length $L_2$ between the second spring contact portion 35b of the slide portion 32 and the second urging force action portion 38b of the push member 34. As this time, owing to the elastic force of the switching spring member 36, a pushing force in the second pushing direction (Z2 direction) continues to act on the push member 34.

In the state shown in FIG. 11, when the force from the pushing action portion 43 acting on the rotating body 20 to rotate clockwise owing to the elastic force of the switching spring member 36 urging the push member 34 in the Z2 direction becomes stronger than the force acting on the rotating body 20 to return to the second stable attitude shown in FIG. 10 owing to the returning elastic force of the return spring members 39 pushing the operation member 31 upward in the Z2 direction along with the push member 34, the rotating body 20 is swiftly rotated in the clockwise direction by the urging force of the switching spring member 36.

Thereafter, when the rotating body 20 rotating in the clockwise direction rotates past the neutral attitude shown in FIG. 8, the first magnetized member 27 is magnetically attracted to the first opposing end portion 11a of the upper magnetic yoke 11, the second magnetized member 28 is magnetically attracted to the second opposing end portion 12a of the lower magnetic yoke 12, and the rotating body 20 swiftly rotates in the clockwise direction to return to the initial attitude shown in FIG. 6. That is, the rotating body 20 returns to the first stable attitude.

While the rotating body 20 swiftly rotates from the second stable attitude shown in FIG. 9 to the first stable attitude, the direction of the magnetic flux in the magnetic path forming member 10 and the coil magnetic core 13 abruptly changes such that an electromotive force is induced in the power generation coil 15.

In the power generation device 1 according to the present embodiment, in the process as shown in FIG. 7 of transitioning from the initial state shown in FIG. 6 to the fully pushed state shown in FIG. 9, the pushing force F1 pushing the operation member 31 in the Z1 direction causes the rotating body 20 to rotate in the counterclockwise direction. Thereafter, as shown in FIG. 8, the urging force of the switching spring member 36 causes the rotating body to rotate in the counterclockwise direction. Note that in the process of transitioning from FIG. 7 to FIG. 8, the urging force of the switching spring member 36 causes the rotating body 20 to rotate in the counterclockwise direction, and as such, the rotating body 20 starts the operation of swiftly rotating to the second stable attitude irrespective of the speed at which the operation member 31 is pushed downward in the first direction (Z1 direction).

Note that in some embodiments of the present invention, when the operation member 31 is pushed downward from the initial state shown in FIG. 6 to the position shown in FIG. 7, the elastic force of the switching spring member 36 may increase to enable the rotating body 20 to be rotated at once from the first stable attitude shown in FIG. 6 to a rotation range past the neutral attitude shown in FIG. 8 only by the elastic force of the switching spring member 36 causing an urging force pushing the push member 34 in the Z1 direction.

The above may similarly apply to the case where the operation member 31 is pushed back in the second direction (Z2 direction) from the pushed state shown in FIG. 9. Also, according to an aspect of the present embodiment, after the rotating body 20 is slightly rotated in the clockwise direction by the returning force of the return spring members 39 in the state shown in FIG. 11, the rotating body 20 is subsequently rotated in the clockwise direction by the urging force of the switching spring member 36. In this way, the rotating body 20 can be swiftly rotated to the first stable attitude irrespective of the returning operation speed of the operation member 31 in the Z2 direction.

Note that in some embodiments, the returning elastic force of the return spring members 39 may not be applied to the rotating body 20 in the state shown in FIG. 11, and the rotating body 20 may be rotated to the first position at once only by the elastic force of the switching spring member 36.

In the power generation device 1 according to the present embodiment, the push member 34 is supported by the operation member 31, and when the operation member 31 moves back and forth, the pushing action portion 43 provided on the push member 34 directly pushes the pushed portions 41 and 42 provided on the rotating body 20 to rotate the rotating body 20. Because the moving direction of the operation member 31 and the rotating direction of the rotating body 20 coincide with each other, a cam mechanism or the like for converting the moving force of the operation member 31 into the rotating force of the rotating body 20 may be unnecessary such that the operating force may not be wasted, and the device may be miniaturized.

In the following, further aspects of the present invention will be described.

A power generation device according to an embodiment of the present invention includes a magnetic path forming member including a first opposing end portion and a second opposing end portion, a power generation coil in which an electromotive force is induced by a change in a magnetic flux in the magnetic path forming member, and a rotating body positioned within an opposing space between the first opposing end portion and the second opposing end portion.

The rotating body includes a magnet including a first magnetization surface and a second magnetization surface with opposite magnetic poles, a first magnetized member that is made of a magnetic material and is fixed to the first magnetization surface, and a second magnetized member that is made of a magnetic member and is fixed to the second magnetization surface.

The rotating body is configured to be rotatable between a first stable attitude and a second stable attitude. In the first stable attitude, the first magnetized member faces the first opposing end portion, and the second magnetized member faces the second opposing end portion. In the second stable attitude, the first magnetized member faces the second opposing end portion, and the second magnetized member faces the first opposing end portion.

The power generation device further includes a push member configured to move back and forth to push the rotating body in a first pushing direction for pushing the rotating body toward the second stable attitude and a second pushing direction for pushing the rotating body toward the first stable attitude, and an operation member configured to move in a first direction and a second direction.

The power generation device further includes a switching spring member arranged between the operation member and the push member. The switching spring member is configured to urge the push member in the first pushing direction to cause the rotating body to move toward the second stable attitude when the operation member moves in the first direction, and the switching spring member is configured to urge the push member in the second pushing direction to cause the rotating body to move toward the first stable attitude when the operation member moves in the second direction.

According to a preferred embodiment, the power generation device further includes a return spring member configured to urge the operation member in the second direction.

According to a preferred embodiment, the switching spring member and the return spring member are compression coil springs, the switching spring member and the return spring member have winding center lines that are parallel to each other, and at least a part of the switching spring member and at least a part of the return spring member overlap with each other in a direction orthogonal to the winding center lines.

According to a preferred embodiment, the power generation device is provided with two return spring members, and the switching spring member is arranged between the two return spring members.

According to a preferred embodiment, the operation member includes a pair of spring contact portions configured to be capable of coming into contact with one part of each end portion of two end portions of the switching spring member; the push member includes a pair of urging force action portions configured to be capable of coming into contact with another part of the each end portion of the two end portions of the switching spring member; and when the operation member moves, the switching spring member is compressed between one of the spring contact portions and one of the urging force action portions, and the push member is urged in the first pushing direction or the second pushing direction.

According to a preferred embodiment, the rotating body includes a pair of pushed portions opposing each other in a rotating direction, and the push member includes a pushing action portion positioned between the pair of pushed portions.

According to a preferred embodiment, the pushing action portion is separated from both of the pair of pushed portions when the rotating body is in the first stable attitude and when the rotating body is in the second stable attitude.

According to a preferred embodiment, the rotating body includes a holding structure that is made of a nonmagnetic material and is configured to hold two of the magnets, the first magnetized member, and the second magnetized member. A support shaft made of metal is arranged to penetrate through the holding structure at a position between the two magnets.

According to a preferred embodiment, the power generation device further includes a frame body, the rotating body is positioned within the frame body, two end portions of the support shaft are supported by the frame body, and the first opposing end portion and the second opposing end portion of the magnetic path forming member are supported by the frame body.

As described above, the power generation device according to an embodiment of the present invention is provided with a push member for pushing the rotating body to move between the first stable attitude and the second stable attitude, and a switching spring member arranged between the operation member and the push member. The rotating body can be urged to rotate solely by the elastic energy of the switching spring member irrespective of whether the operation member moves in the first direction or the second direction. In this way, the rotating body can be swiftly rotated between the two stable attitudes and a desirably large electromotive force can be obtained irrespective of the operation speed of the operation member moving in the first direction or the operation speed of the operation member moving in the second direction.

Also, by providing the rotating body with a pair of pushed portions arranged in a rotating direction, and providing the push member with a pushing action portion positioned between the pair of pushed parts, a pushing force from the push member can act directly on the rotating body without having to provide a power conversion mechanism such as a connection slot and a connection pin as in the related art. In this way, operation force transmission efficiency may be improved and device miniaturization may be facilitated.

Although the present invention has been described above with reference to certain illustrative embodiments, the present invention is not limited to these embodiments, and numerous variations and modifications may be made in light of the above teachings without departing from the scope of the present invention.

What is claimed is:

1. A power generation device comprising:
   a magnetic path forming member including a first opposing end portion and a second opposing end portion;
   a power generation coil in which an electromotive force is induced by a change in a magnetic flux in the magnetic path forming member;
   a rotating body positioned within an opposing space between the first opposing end portion and the second opposing end portion,
      wherein the rotating body includes a magnet having a first magnetization surface and a second magnetization surface with opposite magnetic poles, a first magnetized member that is made of a magnetic material and is fixed to the first magnetization surface, and a second magnetized member that is made of a magnetic material and is fixed to the second magnetization surface, and
      wherein the rotating body is configured to be rotatable between a first stable attitude and a second stable attitude, the first stable attitude having the first magnetized member face the first opposing end portion and having the second magnetized member face the second opposing end portion, and the second stable attitude having the first magnetized member face the second opposing end portion and having the second magnetized member face the first opposing end portion;
   a push member configured to move back and forth to push the rotating body in a first pushing direction for pushing the rotating body toward the second stable attitude and a second pushing direction for pushing the rotating body toward the first stable attitude;
   an operation member configured to move in a first direction and a second direction; and
   a switching spring member arranged between the operation member and the push member,
      wherein the switching spring member is configured to urge the push member in the first pushing direction to cause the rotating body to move toward the second stable attitude when the operation member moves in the first direction, and
      wherein the switching spring member is configured to urge the push member in the second pushing direction to cause the rotating body to move toward the first stable attitude when the operation member moves in the second direction,
      wherein the push member includes a pair of urging force action portions configured to be capable of coming into contact with each of upper and lower end portions of the switching spring member.

2. The power generation device according to claim 1, further comprising:
   a return spring member configured to urge the operation member in the second direction.

3. The power generation device according to claim 2, wherein
   the switching spring member and the return spring member are compression coil springs, the switching spring member and the return spring member have winding center lines that are parallel to each other, and at least a part of the switching spring member and at least a part of the return spring member overlap with each other in a direction orthogonal to the winding center lines.

4. The power generation device according to claim 3, wherein
   two of the return spring members are provided, and the switching spring member is arranged between the two return spring members.

5. The power generation device according to claim 3, wherein
   the operation member includes a pair of spring contact portions configured to be capable of coming into contact with each of the upper and lower end portions of the switching spring member at locations within the upper and lower end portions of the switching sprig member different from locations in which the urging force action portions make contact with the switching spring member; and
   when the operation member moves, the switching spring member is compressed between one of the spring contact portions and one of the urging force action portions, and the push member is urged in the first pushing direction or the second pushing direction.

6. The power generation device according to claim 1, wherein
   the rotating body includes a pair of pushed portions opposing each other in a rotating direction; and
   the push member includes a pushing action portion positioned between the pair of pushed portions.

7. The power generation device according to claim 6, wherein
   the pushing action portion is separated from both of the pair of pushed portions when the rotating body is in the first stable attitude and when the rotating body is in the second stable attitude.

8. The power generation device according to claim 1, wherein
   the rotating body includes a holding structure that is made of a nonmagnetic material and is configured to hold two of the magnets, the first magnetized member, and the second magnetized member; and
   a support shaft made of metal is arranged to penetrate through the holding structure at a position between the two of the magnets.

9. The power generation device according to claim 8, further comprising:
- a frame body;
- wherein the rotating body is positioned within the frame body, two end portions of the support shaft are supported by the frame body, and the first opposing end portion and the second opposing end portion of the magnetic path forming member are supported by the frame body.

10. The power generation device according to claim 1, wherein
- the switching spring member is housed in the magnetic path forming member.

* * * * *